US011102056B1

(12) United States Patent
Fieremans et al.

(10) Patent No.: US 11,102,056 B1
(45) Date of Patent: Aug. 24, 2021

(54) METHOD FOR REQUESTING CONNECTION IN A BLUE-GREEN DEPLOYMENT, METHOD FOR PERFORMING A SWITCHOVER IN A BLUE-GREEN DEPLOYMENT, AND CLIENT-SERVER SYSTEM CONFIGURED FOR BLUE-GREEN DEPLOYMENT

(71) Applicant: Unify Patente GmbH & Co. KG, Munich (DE)

(72) Inventors: Geert Robert Marc Fieremans, Boca Raton, FL (US); Ralph Schneider, Boca Raton, FL (US); Johannes Ruetschi, Boca Raton, FL (US)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 16/914,545

(22) Filed: Jun. 29, 2020

(51) Int. Cl.
  *G06F 15/16* (2006.01)
  *H04L 12/24* (2006.01)
  *H04L 29/06* (2006.01)
  *H04L 29/08* (2006.01)

(52) U.S. Cl.
  CPC ........ *H04L 41/0654* (2013.01); *H04L 67/141* (2013.01); *H04L 67/42* (2013.01)

(58) Field of Classification Search
  CPC . H04L 41/0654; H04L 41/06; H04L 41/0681; H04L 67/141; H04L 67/42
  USPC ...................................................... 709/227
  See application file for complete search history.

(56) References Cited

U.S. PATENT DOCUMENTS

| 7,130,409 | B2 | 10/2006 | Beyda |
| 7,257,629 | B2 | 8/2007 | Manzardo |
| 7,570,163 | B2 | 8/2009 | Ruetschi et al. |
| 8,009,593 | B2 | 8/2011 | Ruetschi et al. |
| 8,325,617 | B2 | 12/2012 | Ruetschi et al. |
| 8,671,206 | B2 | 3/2014 | Fieremans et al. |
| 9,007,894 | B2 | 4/2015 | Ruetschi et al. |
| 10,021,553 | B2 | 7/2018 | Smith et al. |
| 10,133,644 | B2 | 11/2018 | Biermayr et al. |
| 2002/0048263 | A1 | 4/2002 | Fieremans |
| 2007/0005768 | A1* | 1/2007 | Won ........................ H04L 67/16 709/225 |
| 2008/0031147 | A1 | 2/2008 | Fieremans et al. |
| 2013/0332996 | A1* | 12/2013 | Fiala ...................... G06F 21/53 726/4 |
| 2015/0207687 | A1* | 7/2015 | Richman ............. H04L 41/0816 370/236 |

(Continued)

*Primary Examiner* — Ruolei Zong
(74) *Attorney, Agent, or Firm* — Buchanan Ingersoll & Rooney PC

(57) ABSTRACT

A method for requesting connection in a blue-green deployment which is switched over from a first server (blue) to which at least two clients are connected to a second server (green). The method can include determining, upon receipt of the maintenance notification or detection of a connection failure, an activity score at each one of the at least two clients; and, upon switchover to the second server or detection of the connection failure, transmitting, together with a respective reconnection request, the respective activity score from each one of the at least two clients to the second server for the second server to evaluate a prioritization of the reconnection request based on the activity score. Embodiments of a communication system, server system, and clients (e.g. user devices) can utilize embodiments of the method.

18 Claims, 3 Drawing Sheets

(56) References Cited

U.S. PATENT DOCUMENTS

| | | | |
|---|---|---|---|
| 2015/0230274 A1* | 8/2015 | Sharma | H04W 76/12 |
| | | | 370/329 |
| 2015/0237641 A1* | 8/2015 | Sahu | H04W 72/10 |
| | | | 370/315 |
| 2016/0088071 A1 | 3/2016 | Ruetschi et al. | |
| 2016/0139910 A1* | 5/2016 | Ramanathan | H04L 41/0893 |
| | | | 717/170 |
| 2016/0337263 A1* | 11/2016 | Imai | H04L 47/827 |
| 2017/0126751 A1 | 5/2017 | Stach et al. | |
| 2017/0201589 A1* | 7/2017 | Fiala | H04L 67/141 |
| 2018/0198868 A1 | 7/2018 | Klaghofer et al. | |
| 2019/0050218 A1* | 2/2019 | Giatilis | G06F 8/60 |
| 2020/0159852 A1* | 5/2020 | Meissner | G06F 8/65 |

\* cited by examiner

METHOD FOR REQUESTING CONNECTION IN A BLUE-GREEN DEPLOYMENT, METHOD FOR PERFORMING A SWITCHOVER IN A BLUE-GREEN DEPLOYMENT, AND CLIENT-SERVER SYSTEM CONFIGURED FOR BLUE-GREEN DEPLOYMENT

FIELD

The present invention relates to a method for requesting connection in a blue-green deployment, a method for performing a switchover in a blue-green deployment, and to a client-server system configured for blue-green deployment.

BACKGROUND

Blue-green deployment is known in prior art as a system redundancy concept that reduces downtime and risk by running two identical production environments, one being called "blue" and the other being called "green", wherein at any given time, always one of the environments is live (active) serving all production traffic, while the other one is not live (standby).

Assuming in what follows a very large-scale system, where blue is currently live (i.e. active) and green is not (hence, standby). There are two scenarios, where green will become the live system and blue the standby system:
 (1) A failure of the blue system triggers an automatic switchover to the green system.
 (2) Regular software maintenance to be done on the blue system triggers a controlled switchover to the green system.

However, such a switchover may cause a temporary outage, if for example, a very large number of clients, subscribers or users need to register or login after the switch-over. A large system typically throttles registrations or logins to safeguard against overload conditions. As a result, it may take hours to login all users. Active users on the system at the time of the failover could therefore experience a significant outage.

SUMMARY

We have determined that there exists a problem of minimizing outage impact for users. This problem is solved by embodiments of our inventive method for requesting connection in a blue-green deployment that hosts one or more services to clients, embodiments of a method for requesting connection in a blue-green deployment, embodiments of a method for performing a switchover in a blue-green deployment, and a client-server system configured for blue-green deployment.

According to embodiments of the present invention, a method for requesting connection in a blue-green deployment which is switched over from a first server to which at least two clients are connected, the first server representing the blue system, to a second server, which represents the green system in the blue-green deployment, can include:
 receiving at the at least two clients, a respective maintenance notification, from the first server;
 respectively determining, upon receipt of the maintenance notification, an activity score at each one of the at least two clients;
 upon switchover to the second server, transmitting, together with a respective reconnection request, the respective activity score from each one of the at least two clients to the second server for the second server to evaluate a prioritization of the reconnection request based on the activity score.

It should be appreciated that each of the first and second servers of the blue-green deployment can be configured to host at least one service of the deployment that is provideable to clients connected to the system of servers of the deployment. Each of the servers can be a computer device that includes hardware. The hardware of each server can include a processor connected to a non-transitory computer readable medium (e.g. non-transitory memory) and at least one interface for communicative connections (e.g. network card for a network connection to a large area network, local area network, or a wireless large area network, or other type of interface). Each server can be connected to or include input devices, output devices, and/or input/output devices such as a pointer device, a keyboard, or a touch screen display.

Each server can be configured for communicative connection to clients, which can be user devices that run an application for utilization of one or more services hosted by the server. Each user device can include a processor connected to non-transitory memory that has the application stored thereon and at least one interface. Each user device can also include input devices, output devices, and/or input/output devices such as a pointer device, a keyboard, or a touch screen display. Examples of user devices can include personal computers, laptop computers, tablets, and smart phones.

By embodiments of the inventive method, a user utilizing a client for use of at least one service hosted by the servers can be provided with a perception of outage free operations while the system is partially available when the green system becomes active and the blue system is in standby mode. A user who during the switch-over event currently is rather active and may be involved in web conferences or collaboration and communication sessions for which he or she urgently needs the connectivity can be reconnected immediately and a user who currently may not be active or who has scheduled for a web conference at a later point of time when it is estimated that the system will be running again can be delayed as to reconnection to the new system or server during the switchover. Thus, the user who is active is able to continue his or her work and the user who is inactive will not even notice that he or she has lost connectivity.

According to a preferred embodiment of the invention, the maintenance notification comprises a point of time for performing the switchover from the first server to the second server.

In embodiments of a method for requesting connection in a blue-green deployment which is switched over from a first server to which at least two clients are connected, the first server representing the blue system, to a second server, which represents the green system in the blue-green deployment, the method can include:
 detecting, at each one of the at least two clients, loss of connectivity to the first server;
 respectively determining, upon detection of the loss of connectivity to the first server, an activity score at each one of the at least two clients;
 transmitting, together with a respective reconnection request, the respective activity score from each one of the at least two clients to the second server for the second server to evaluate a prioritization of the reconnection request based on the activity score.

As outlined above, by embodiments of the inventive method, a user can be provided with a perception of outage free operations while the system is partially available during a switchover where the green system becomes active and the blue system is in standby mode. While a user who during the switch-over event currently is rather active and may be involved in web conferences or collaboration and communication sessions for which he or she urgently needs the connectivity is reconnected immediately, a user who currently may not be active or who has scheduled for a web conference at a later point of time when it is estimated that the system will be running again is delayed as to reconnection to the new system or server. Thus, the user who is active is able to continue his or her work and the user who is inactive will not even notice that he or she has lost connectivity.

According to a preferred embodiment of the invention, in the step of transmitting the activity score, also the registration, login or subscription to services on a new connection to the green system, in particular, to the second server is transmitted by each one of the at least two clients.

According to another preferred embodiment of the invention, in the step of transmitting the activity score, also a trust score is transmitted to the green system, in particular, to the second server, by each one of the at least two clients, the trust score being derived from a fingerprint of each one of the at least two clients.

Preferably, the activity score represents an expected need of a client of the at least two clients to be reconnected after the switchover has been performed.

Moreover, the activity score may be a value between 0 and 1, the value 0 referring to a low need to be reconnected, and the value 1 referring to a high need to be reconnected.

According to still another preferred embodiment of the invention, each client of the at least two clients, upon detecting user activity, updates its activity score while waiting for reconnection, and transmits the updated activity score to the second server.

According to yet another preferred embodiment of the invention, the activity score is determined at each one of the at least two clients by accessing a user's calendar for verifying upcoming meetings, in particular, web conferences and other appointments requiring the use of the first or second server.

Preferably, the activity score is determined at each one of the at least two clients by detecting screen, touch interface, face detection, or motion activities.

Further, it is advantageous, if the activity score is determined at each one of the at least two clients by detecting at least one of a foreground or background state of the client, user keyboard activity, upcoming meetings with web conferencing through an Office365 (provided by Microsoft), or GSuite (provided by Google) integration, or any other application providing an indication of upcoming client activity.

Also, each one of the at least two clients may send a trust score token to the second server to enable the second server to rank the client by trustworthiness.

Moreover, according to embodiments of the present invention, a method for performing a switchover in a blue-green deployment from a first server to which at least two clients are connected, the first server representing the blue system, to a second server, which represents the green system in the blue-green deployment can include:

receiving, after switchover, at the second server, a reconnection request from each one of the at least two clients, the reconnection request comprising an activity score and a trust score, determining based on the activity score and the trust score in each reconnection request, a priority for reconnection of the corresponding client; and reconnecting each client of the at least two clients according to the priority determined.

Further, according to the present invention, embodiments of a client-server system configured for blue-green deployment is provided. The client-server system can include a first server that represents the blue system and a second server that represents the green system, and at least two clients. The servers and clients can be configured to carry out embodiments of the methods described above and discussed herein.

Embodiments of the client-server system includes a first server that represents the blue system and a second server that represents the green system, and at least two clients, wherein the second server is configured to carry out the method for performing a switchover in a blue-green deployment from a first server to which at least two clients are connected, the first server representing the blue system, to a second server, which represents the green system in the blue-green deployment.

Other details, objects, and advantages of the invention will become apparent as the following description of certain exemplary embodiments thereof and certain exemplary methods of practicing the same proceeds.

BRIEF DESCRIPTION OF THE DRAWINGS

The invention and embodiments thereof will be described below in further detail in connection with the drawings.

Figure 1:
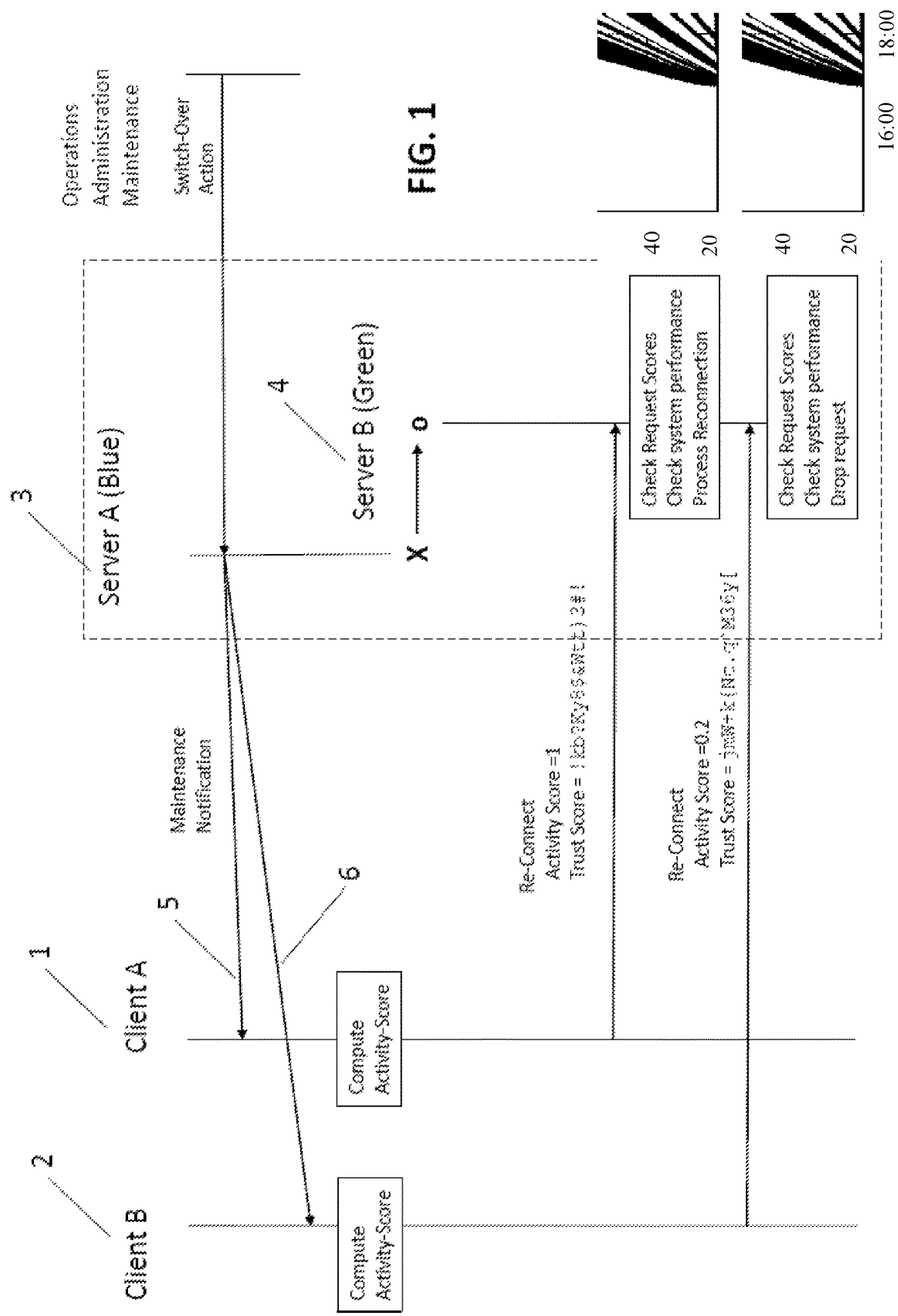
FIG. 1 shows a first scenario of a controlled switchover according to an embodiment of the invention.

REFERENCE NUMERALS USED IN THE DRAWINGS INCLUDE 1 first client
2 second client
3 first server
4 second server
5 maintenance notification to first client
6 maintenance notification to second client
7 third client

DETAILED DESCRIPTION

FIG. 1 shows a first scenario of a controlled switchover according to an embodiment of the invention. In the scenario illustrated here, a first client 1 ("Client A") and a second client 2 ("Client B") are connected to a first server 3 ("Server A"), that is currently active and thus represents the blue system. According to operations, administration and maintenance (OAM) processes, a switch-over action to a second server 4 ("Server B") that currently is the green system is envisaged at a predetermined point of time. Accordingly, the first server 3 is notified about the scheduled switch-over action and upon receipt of the notification, the first server 3 correspondingly notifies the first client 1 and the second client about the scheduled switchover action by sending respective maintenance notifications 5, 6 to the first and second clients 1, 2 comprising information on the planned switchover event and the time of the planned and controlled switch-over event.

Upon receipt of the maintenance notification, the first client 1 and the second client 2 respectively calculate an activity score and respectively send the respective activity score along with the respective registration, login or subscription to services on the new connection to the green system, which in the illustrated scenario is the second server 4, once the switchover time occurs.

The activity score calculated by the clients 1, 2 is represented as a value between 0 and 1. The score is a representation of the expected need to be re-connected to the system, which in the illustrated scenario would be the second server 4.

The activity score could be represented as 1, if the user of the client, for example, the user of the first client 1, is active in a real-time session while the switchover happens, whereas it could be, for example, determined as being 0.75, if the user has a call scheduled within 15 minutes, or as being 0.5, if the user has only been sending sporadic text messages, or as being 0, if the user hasn't been active at all for a predetermined period of time.

As, at the scheduled point of time, the controlled switchover from the first server 3 to the second server 4 is carried out, the green system, namely, the second server 4, which now will be the live or active system prioritizes the processing of connection requests made by the first and second clients 1, 2 based on the activity score provided by the reconnecting clients 1, 2 and based on a "client trust" score derived from a client fingerprint. The client trust score is used to distinguish between application publishers, for example in-house application versus $3^{rd}$ party application written with Software Development Kits (SDKs).

Clients with an activity score of 1 and a high trust score are immediately reconnected. Therefore, users with high activity score clients do not perceive an outage. However, the rapid reconnection of the high activity score clients may generate heavy system load. Clients with lower activity scores are only reconnected once the load on the system allows seamless operation for connected clients and a controlled rate of reconnections for clients with a lower activity score. Users with low activity score devices will most likely not notice an outage or service interruption.

In the example shown here, the first client 1 that needs to reconnect after the switchover has an activity score of 1, whereas the second client only has an activity score of 0.2. Therefore, the second server 4 will prioritize the first client 1 with respect to the reconnection procedure, while the second client 2 will be reconnected to a later point of time.

It should be appreciated that the first server 3, second server 4, first client 1 and second client 2 can each be electronic communication devices. The first and second servers can each be server computer devices that include hardware such as, for example, a processor connected to a non-transitory memory and at least one interface for communication connections with clients and/or other devices. Input devices, output devices and/or input/output devices can also be included in the servers or connected to them (e.g. pointer devices, keyboards, displays, touch screen displays, etc.).

Each client can be a user device that runs an application for use of at least one service hosted by the servers of the system. The user devices can be, for example, laptop computers, personal computers, tablets, smart phones, or other type of communication terminal device. Each user device can include hardware such as, for example, a processor connected to a non-transitory memory and at least one interface for communication connections with at least one of the servers and/or other devices. Input devices, output devices and/or input/output devices can also be included in the user deices or connected to them (e.g. pointer devices, keyboards, displays, touch screen displays, etc.).

Each server can be connected to the clients via communication connections formed via at least one network connection in some embodiments. The network connection can include the internet, an enterprise network, a local area network, a large area network, or a combination of such networks. Routers, access points, gateways, and other intermediate network nodes can be include in the system to facilitate the communication connections between the clients and the servers.

Figure 2:
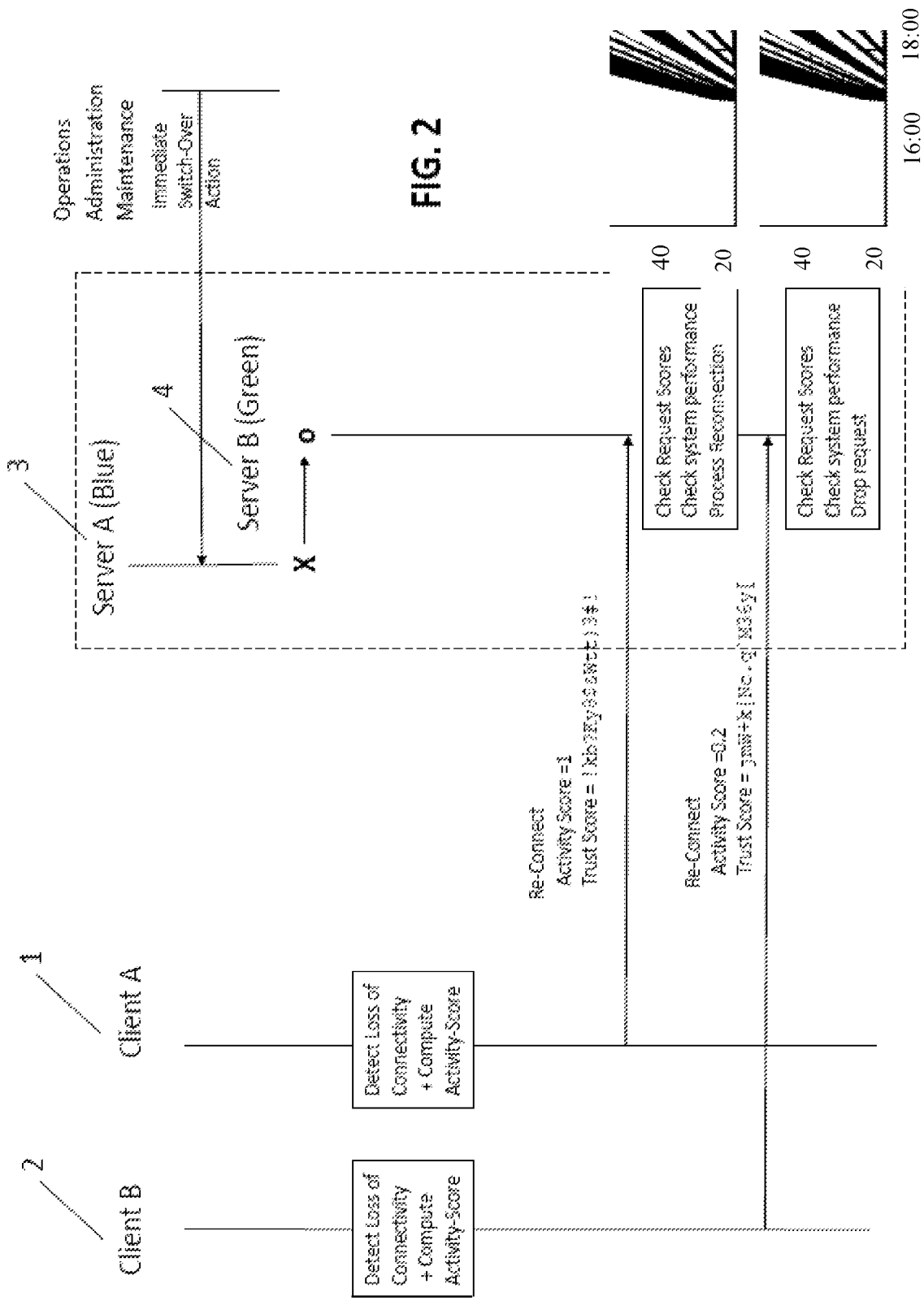
FIG. 2 shows a second scenario of a switchover after failure according to an embodiment of the invention.

FIG. 2 shows a second scenario of a switchover after failure according to an embodiment of the invention. The scenario illustrated here differs from the one shown in FIG. 1 in that the switchover is carried out after failure instead of a controlled and scheduled switchover. Therefore, the clients 1, 2 are not notified prior to the switchover. Rather, the first and second clients 1, 2 respectively detect the closing of the communication path to the blue system, namely, the first server 3, upon a switchover after failure, and immediately calculate an activity score which is then sent along with the registration, login or subscription to services on the new connection to the green system, namely, the second server 4, which now will be the live or active system. The second server 4 will again prioritize the processing of connection requests made by the first and second clients 1, 2 based on the activity score provided by the reconnecting clients 1, 2 and based on the client trust score as outlined above with respect to FIG. 1.

In some embodiments, each client can be configured to respond to a detection of a lost connection to the first server 3 for a pre-selected period of time as being a lost connection due to a failure. Such a detection can trigger each client sending a request for a connection to the second server 4 that includes the an activity score, the registration information and/or login or subscription information for forming a new connection with the second server 4 to resume use of the services hosted by the server system.

In the example shown here, the first client 1 that needs to reconnect after the switchover again has an activity score of 1, whereas the second client again only has an activity score of 0.2. Therefore, the second server 4 will prioritize the first client 1 with respect to the reconnection procedure, while the second client 2 will be reconnected to a later point of time.

Figure 3:
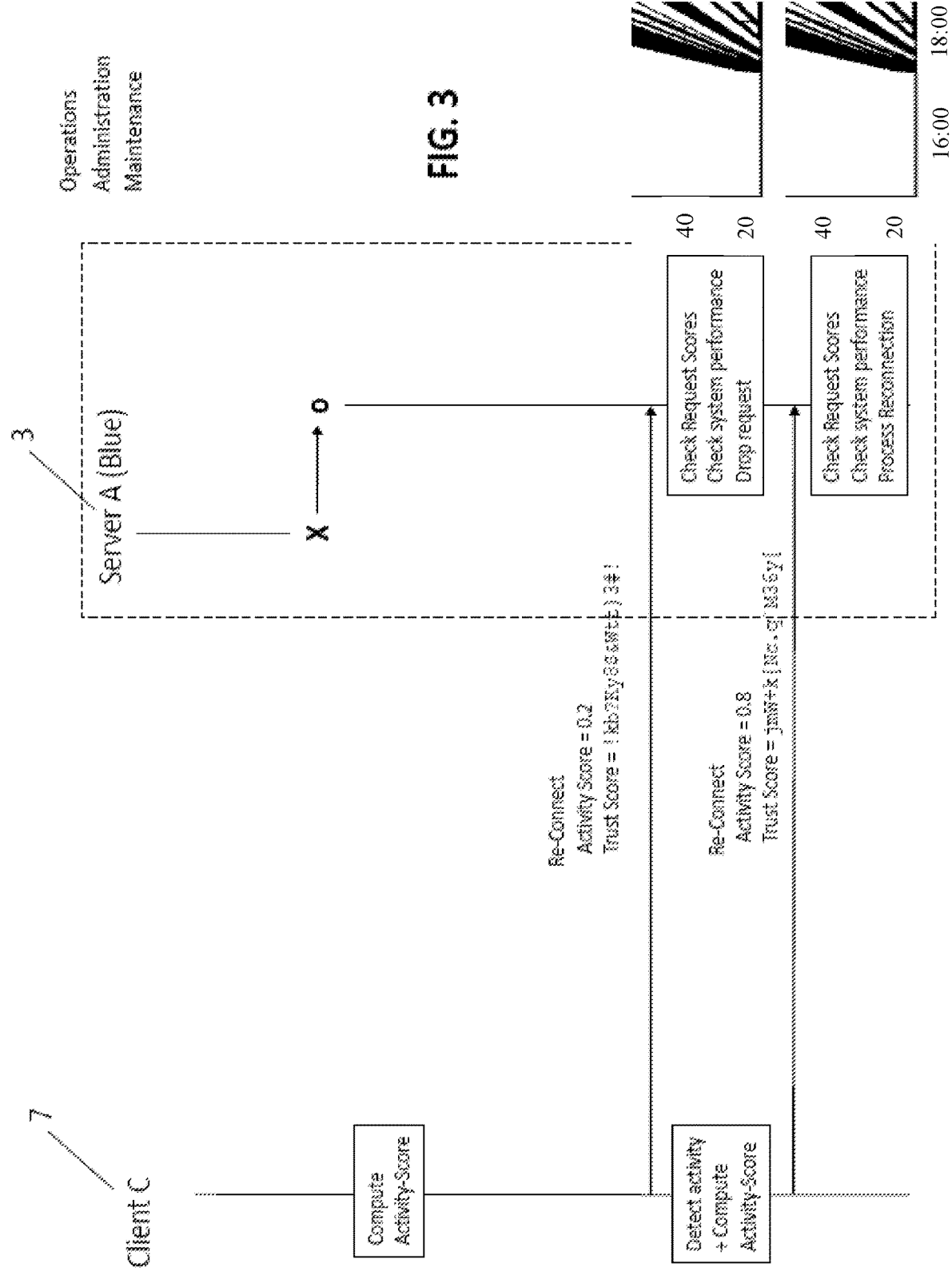
FIG. 3 schematically illustrates the procedure of updating an activity score according to an embodiment of the invention.

FIG. 3 schematically illustrates the procedure of updating an activity score according to another embodiment of the invention. As clients may also update their activity score while waiting for a reconnection, a client may simply send a new request with a higher activity score to the second server 4 that will be active after the switchover. For example, as shown here, a further client or third client 7 (client C) that is connected to the first server 3 that currently has an activity score of 0.2, and thus a rather low activity score, detects activity of its user. Upon this detection, the third client 7 computes the activity score again and sends the recalculated updated new activity score which in the example now is 0.8 and thus, much higher than the previous one, to the first server A. As the first activity score of 0.2 was too low to be prioritized for reconnection, the new activity score of 0.8 is sufficient for the reconnection of the third client 7 being prioritized and thus, processed.

As described herein, a unique feature of the embodiments illustrated and discussed herein is the computation of the activity score by the clients. Clients are able to identify user activity that the server may not be able to identify, for example:

a mobile application may access a user's calendar to see upcoming meetings with web-conferencing, or may detect screen, touch interface, face detection, or motion activities;

a desktop application may detect foreground or background state, user keyboard activity, upcoming meetings with web-conferencing through an Exchange, Office365, or GSuite integration or any other application providing an indication of upcoming client activity.

The activity score generated by each client can be determined based on detection, by the client, of least one of screen, touch interface, face detection, and motion activities. The activity score can also be generated based on each client accessing a user's calendar for verifying upcoming meetings, web conferences and/or other appointments requiring the use of the at least one service. After an activity score is sent to a second server 4, the client can update its activity score to account for detection of new activity or a new scheduled event or other action and send the updated activity score to the second server so that the second server can evaluate the connection request for the client with the updated activity score information for prioritizing reconnection of the client to the at least service hosted by the blue-green deployment (and by the second server who is taking over for the first server). The updated activity score may result in the second server reprioritizing connections of some clients to account for the updated activity score information it receives from the clients.

Additionally, the clients can each signal a trust score token to the server that enables the server to rank the client by trustworthiness, and thus, the server can be in a unique position to service reconnection-requests from clients based on the client activity score, the client trust score, and the system performance so as to enable an outage free reconnection perception to the users of clients that are to be reconnected after switchover, as described above. The trust score that is generated and identified via the trust score token can take into account the detected user activity and the likelihood that the activity may result in use of a service hosted by a server. The trust score can also be generated to take into a likelihood of a need for a user of the service based on the user's empirical history of using the service at different times of different days in addition to other variables related to the user's empirical past use of the service(s) hosted by the server system.

While certain exemplary embodiments of apparatuses, networks, servers, user devices, communication platforms, and communication systems and methods of making and using the same have been discussed and illustrated herein, it is to be distinctly understood that the invention is not limited thereto but may be otherwise variously embodied and practiced within the scope of the following claims.

What is claimed is:

1. A method for requesting connection in a blue-green deployment which is switched over from a first server to which at least two clients are connected, the first server representing a blue system of the blue-green deployment that hosts at least one service, to a second server, which represents a green system in the blue-green deployment, the method comprising:

receiving at the at least two clients, a respective maintenance notification, from the first server;

respectively determining, upon receipt of the maintenance notification, an activity score at each one of the at least two clients;

upon switchover to the second server, transmitting, together with a respective reconnection request, the respective activity score from each one of the at least two clients to the second server for the second server to evaluate a prioritization of the reconnection request based on the activity score.

2. The method of claim 1, wherein the maintenance notification comprises a point of time for performing the switchover from the first server to the second server.

3. A method for requesting connection in a blue-green deployment which is switched over from a first server to which at least two clients are connected, the first server representing a blue system in the blue-green deployment that hosts at least one service, to a second server, which represents a green system in the blue-green deployment, the method comprising:

detecting, at each one of the at least two clients, loss of connectivity to the first server;

determining, upon detection of the loss of connectivity to the first server, an activity score at each one of the at least two clients;

each of the clients transmitting, together with a reconnection request, the activity score from each one of the at least two clients to the second server for the second server to evaluate a prioritization of the reconnection request based on the activity score for connection of the clients to the second server.

4. The method according of claim 3, wherein in reconnection request also includes information for at least one of registration, login and subscription to services on a new connection to the second server.

5. The method of claim 3, comprising:

each of the clients generated a trust score for the activity score, and wherein the reconnection request also includes the trust score.

6. The method of claim 5, wherein the trust score is derived from a fingerprint of the client.

7. The method of claim 5, wherein each of the clients sends the trust score to the second server to enable the second server to rank the client by trustworthiness.

8. The method of claim 3, wherein the activity score represents an expected need of a client of to be connected for use of the at least one service.

9. The method according to claim 8, wherein the activity score is a value between 0 and 1.

10. The method of claim 9, wherein the value of 0 refers to a low need to be reconnected, and the value of 1 refers to a high need to be reconnected.

11. The method of claim 3, comprising:

each client, upon detecting user activity, updates its activity score while waiting for reconnection, and transmits the updated activity score to the second server.

12. The method of claim 3, wherein the activity score is determined by accessing a user's calendar for verifying at least one of upcoming meetings, web conferences and other appointments requiring the use of the at least one service.

13. The method of claim 3, wherein the activity score is determined based on detection, by the client, of least one of screen, touch interface, face detection, and motion activities.

14. The method of claim 3, wherein the activity score is determined based on the client detecting at least one of a foreground or background state of the client, user keyboard activity, upcoming meetings with web-conferencing or any other application providing an indication of upcoming activity of the client.

15. A method for performing a switchover in a blue-green deployment that hosts at least one service from a first server to which at least two clients are connected, the first server representing a blue system of the blue-green deployment, to a second server, which represents a green system in the blue-green deployment, the method comprising:

the second server becoming active to switch support of the at least one service from the first server to the second sever;

the second server determining a priority for reconnection for the clients based on an activity score and a trust score in each reconnection request received from the clients; and the second server reconnecting each of the clients for use of the at least one service according to the determined priority.

16. A client-server system configured for blue-green deployment, the client-server system comprising a first server that represents the blue system and a second server that represents the green system, and at least two clients, wherein each one of the at least two clients is configured to carry out the method of claim 1, each of the at least two clients being a user device that includes hardware including a processor connected to a non-transitory computer readable medium, the second server being a computer device that includes hardware including a processor connected to a non-transitory computer readable medium and the first server being a computer device that includes hardware including a processor connected to a non-transitory computer readable medium.

17. A client-server system configured for blue-green deployment, the client-server system comprising a first server that represents the blue system and a second server that represents the green system, and at least two clients, wherein each one of the at least two clients is configured to carry out the method of claim 3, each of the at least two clients being a user device that includes hardware including a processor connected to a non-transitory computer readable medium, the second server being a computer device that includes hardware including a processor connected to a non-transitory computer readable medium and the first server being a computer device that includes hardware including a processor connected to a non-transitory computer readable medium.

18. A client-server system configured for blue-green deployment, the client-server system comprising a first server that represents the blue system and a second server that represents the green system, and at least two clients, wherein the second server is configured to carry out the method of claim 15, the second server being a computer device that includes hardware including a processor connected to a non-transitory computer readable medium and the first server being a computer device that includes hardware including a processor connected to a non-transitory computer readable medium.

* * * * *